United States Patent [19]
Verdonck

[11] Patent Number: 5,316,523
[45] Date of Patent: May 31, 1994

[54] SPROCKET CONTROL APPARATUS

[75] Inventor: Gerard J. Verdonck, Gistel, Belgium

[73] Assignee: Summagraphics N.V., Gistel, Belgium

[21] Appl. No.: 766,438

[22] Filed: Sep. 25, 1991

[51] Int. Cl.⁵ .............................................. F16H 7/14
[52] U.S. Cl. ................................... 474/118; 474/134; 474/150; 474/900
[58] Field of Search ............... 474/101, 113, 118, 121, 474/134, 139, 149, 150, 160, 163, 164, 900

[56] References Cited

U.S. PATENT DOCUMENTS

| | | | |
|---|---|---|---|
| 2,352,797 | 7/1944 | Miller | 474/900 |
| 3,381,867 | 5/1968 | Konkel | |
| 3,888,217 | 6/1975 | Hisserich | 474/900 |
| 3,978,737 | 9/1976 | Bailey | 474/138 |
| 4,404,907 | 9/1983 | Kobler et al. | 474/131 |

FOREIGN PATENT DOCUMENTS 178042 10/1983 Japan ................................ 474/900
2206175 12/1988 United Kingdom .

Primary Examiner—Ramon S. Britts
Assistant Examiner—Roger J. Schoeppel
Attorney, Agent, or Firm—Rosen, Dainow & Jacobs

[57] ABSTRACT

A device, such as a printer or plotter for driving media, has sprocket wheels with sprockets engaging sprocket holes at the edges of the media. The sprocket wheels are driven via a drive belt. In order to adjust the relative angular position of one of the sprocket wheels, rollers are mounted on an adjustment lever to separately engage two courses of the drive belt. Pivoting of the lever effects the adjustment of the lengths of the two courses of the belt. During an adjustment procedure, one sprocket wheel is held fixed, and the lever is pivoted to effect the angular displacement of the other sprocket wheel.

21 Claims, 2 Drawing Sheets

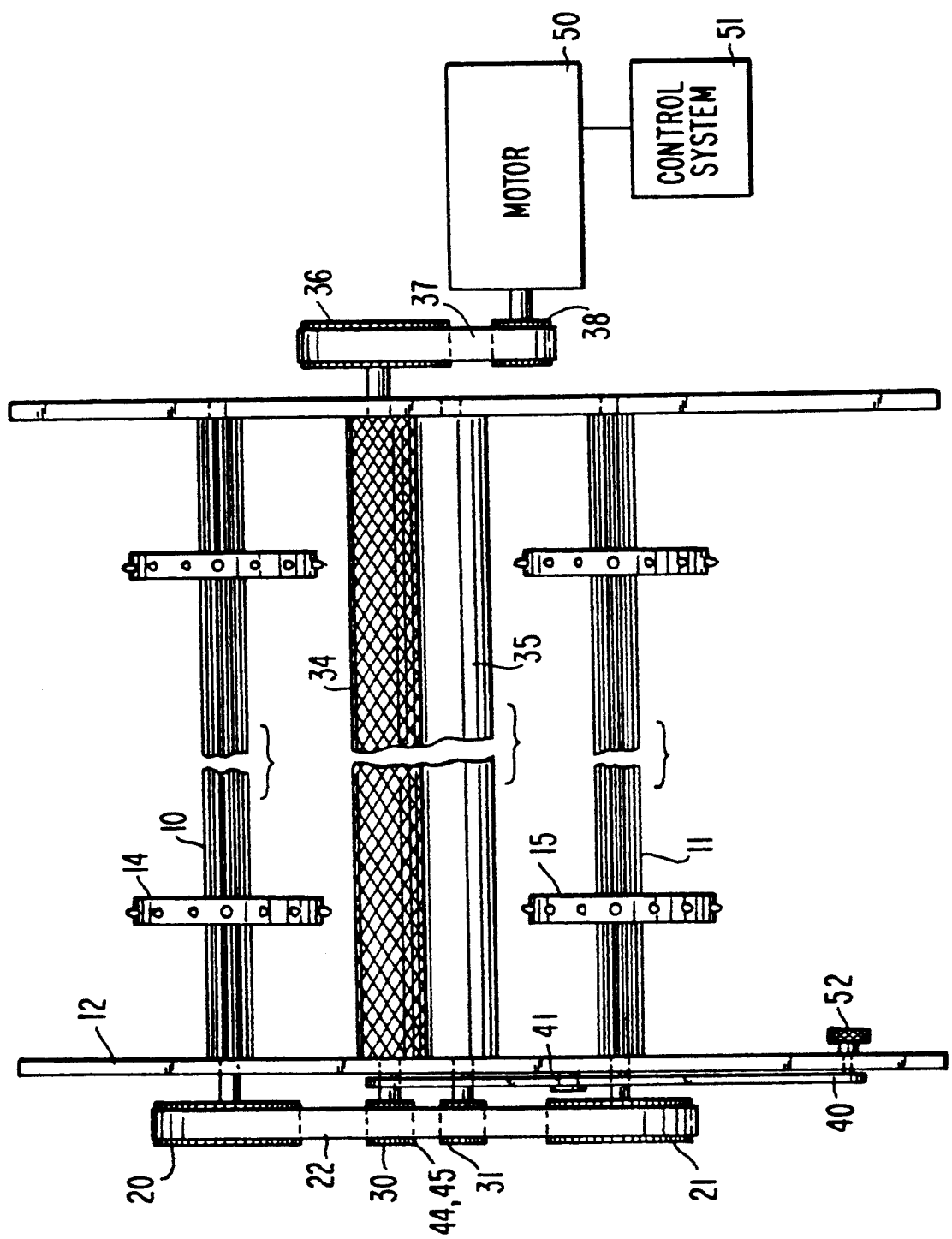

SPROCKET CONTROL APPARATUS

This invention relates to an apparatus for controlling the angular displacement or relative angular position of a sprocket wheel in a device for feeding or guiding media such as paper, vinyl, etc. More specifically, the apparatus relates to adjusting the angular position of a sprocket wheel to adjust the tension of the media in the device.

BACKGROUND OF THE INVENTION

Devices such as printers, plotters, cutters or the like, are frequently provided with sprocket wheels for feeding a media. The media is provided with sprocket holes along at least one edge for receiving the sprocket teeth of the sprocket wheels. On occasion the tension of the media may vary, especially when the media is a stretchable material, such as vinyl, resulting in improper drive of the media.

SUMMARY OF THE INVENTION

The present invention is therefore directed to the provision of a sprocket control apparatus adapted to overcome the above discussed problem.

Briefly stated, in accordance with the invention, an arrangement is provided for adjusting the angular displacement or relative angular position of a sprocket wheel that is rotatably mounted on a first axis. The arrangement includes a pulley mounted for rotation with the sprocket wheel. A holding arrangement is spaced from the first axis, and a belt extends around the pulley from the holding means. First and second courses or runs of the belt thus extend between the pulley and the holding arrangement and the belt is held by said holding arrangement. Adjustment means are provided for simultaneously changing the lengths of the belt in opposite directions in the first and second courses.

In a preferred embodiment of the invention, the device is a media driving device which has first and second sprocket wheels mounted on parallel spaced apart first and second rotatable shafts, respectively. The pulleys are fixed to the respective shafts to rotate therewith by, for example, a spline arrangement. A first pulley is mounted on the first shaft, a second pulley is mounted on the second shaft, and a belt extends around the pulleys. The belt also engages a driving element in the form of a drive pulley mounted to be driven by a motor, so that rotation of the motor rotates the drive pulley and causes the belt to rotate and drive the first and second pulleys to effect rotation of the rotatable shafts, and hence the sprocket wheels affixed thereto. In this arrangement, the belt thus has first and second courses extending from the drive pulley to the two pulleys. The drive pulley preferably engages the belt on the inside of the loop formed by the belt. The drive pulley is held fixed by the motor when the motor is stopped, and the belt engaged by the drive pulley holds the second sprocket wheel (part of the holding arrangement) at a fixed position when the motor is stopped.

In accordance with the invention, a first roller engages the first course of the belt between the drive pulley and the second pulley, and a second roller engages the second course of the belt between the first and second pulleys. The first and second rollers preferably engage the outer circumferential surface of the belt, i.e. the outside of the loop formed by the belt.

The first and second rollers are mounted on a pivoted control lever to be simultaneously movable under the control of the operator. The control lever is positioned so that pivoting of the lever effects the changing of the relative lengths of the belt in the first and second courses, in opposite directions, in substantially equal amounts. This enables the first sprocket wheel to be angularly displaced without rotation of the second sprocket wheel. A clamping arrangement, such as a thumb wheel, enables the lever to be held at any adjustment position.

It is of course apparent that the belt may be supported and guided by additional rollers.

The minimum adjustment range is an angular displacement of the first sprocket wheel corresponding to the distance between two adjacent sprocket teeth.

BRIEF DESCRIPTION OF THE DRAWING

In order that the invention may be more clearly understood, it will now be disclosed in greater detail with reference to the accompanying drawing, wherein:

FIG. 3 is a top view of portions of the arrangement of FIGS. 1 and 2.

DETAILED DISCLOSURE OF THE INVENTION

Figure 1:
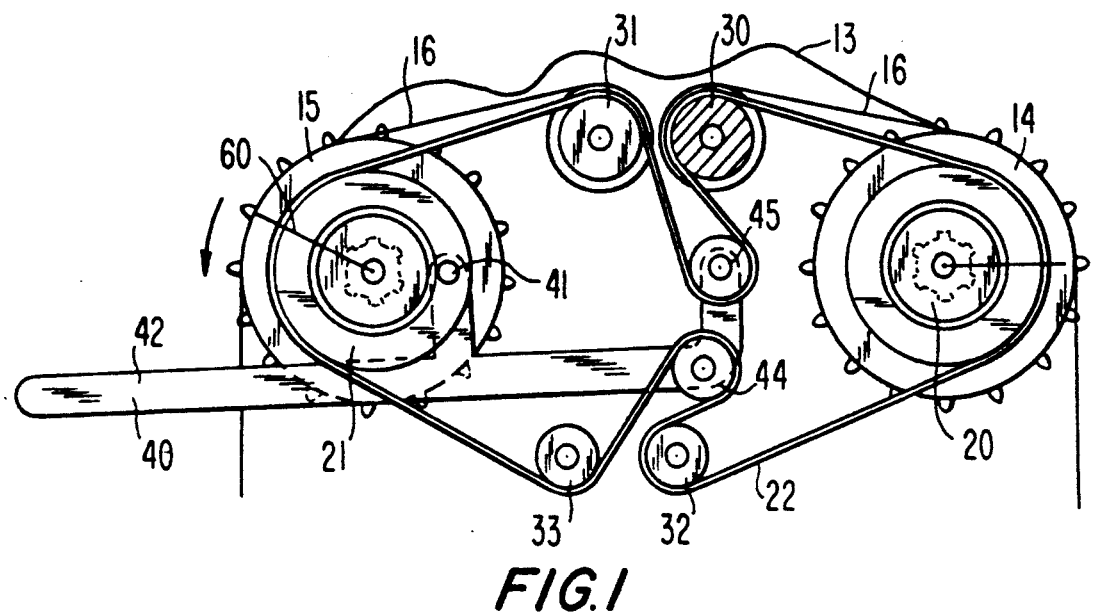
FIG. 1 is simplified illustration of elements of a sprocket wheel control apparatus of the invention before adjustment of the angular displacement of one of the sprocket wheels, for explaining the operational concept of the invention.

Referring now to the drawings, a pair of parallel spaced apart splined shafts 10, 11 are rotatably mounted to a machine frame 12 (FIG. 3) of a device such as a printer, plotter, cutter or the like, adapted to feed a media 13 such as paper, vinyl, etc. It will be apparent that the invention is not limited to this selection of devices or media.

Sprocket wheels 14, 15 are mounted on the shafts 10, 11, respectively, for rotation therewith by a spline arrangement which enables the sprocket wheels to be axially displaced on the shafts, in conventional manner, in order to adapt the device for the feeding of different widths of media. The media may be further guided by a conventional platen arrangement 16 (illustrated only in FIG. 1). The invention is not limited to the provision of these features.

A pulley 20 is mounted on the shaft 10, for rotation therewith, and a pulley 21 is mounted on the shaft 11, for rotation therewith. The mounting arrangement of these pulleys is conventional.

A endless belt 22 extends around the two pulleys 20 and 21. In one run of belt 22 between pulleys 14 and 15, belt 22 is guided into engagement with a drive pulley 30 and another pulley 31 by a guide or idler roller 45, and in the other run of belt 22 between pulleys 14 and 15, belt 22 is guided by guide or idler rollers 32, 33 and 44. Pulleys 30 and 31 are connected to rotate with platen rollers 34 and 35 (FIG. 3) which are exposed within platen arrangement 16 and which contact the media 13 as it is driven over platen arrangement 16. At the end of roller 34 opposite the end to which drive pulley 30 is connected, another pulley 36 (FIG. 3) is connected to roller 34. An endless belt 37 passes around pulley 36 and a pulley 38 which is driven by a motor 50 under control of motor control system 51. Thus, motor 50 rotates roller 34 via belt 37 and pulleys 38 and 36, and roller 34 drives belt 22 via drive pulley 30.

In order for the device to properly feed the media, the sprocket holes of the media should be spaced such that the media lays directly against the platen arrangement 16, and is not stretched too tight or too slack, in this position. For example, due to tolerances of or improper spacing between the sprocket holes in the media, or due to stretching or contracting of the media, the media may be excessively loose between the sprocket wheels, as illustrated in FIG. 1, or may be stretched too tight or loose between the sprocket teeth for proper feeding, or may be too taut between the sprocket wheels.

In order to avoid this problem, in accordance with the invention, a lever 40 is pivoted to the machine frame, on an axis 41 that will be discussed hereafter in greater detail. The lever extends sufficiently in one direction to provide a handle 42 that can be manipulated by an operator. The other end of the lever supports rollers 44 and 45 spaced apart on parallel axes.

Figure 2:
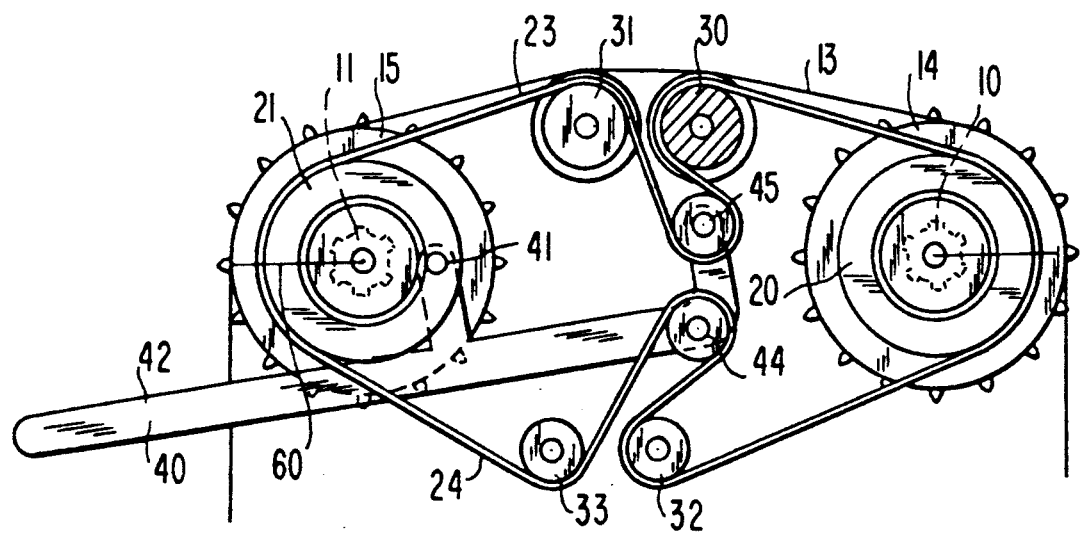
FIG. 2 is a simplified illustration corresponding to that of FIG. 1, but wherein the angular displacement of one of the sprocket wheels has been adjusted in accordance with the invention.

As illustrated in the drawings, the upper course 23 of the belt from pulley 30 to pulley 15 extends inwardly of the roller 31 toward the course 24,, i.e. in a reentrant manner, so that its outer surface is guided by the roller 45. Similarly the lower course 24 of the belt from pulley 30 over pulley 14 to pulley 15 extends inwardly of the rollers 32, 33, i.e. toward the course 23, i.e. in a reentrant manner, so that its outer surface is guided by the roller 44. It is thus apparent that, upon rotation of the lever 40, e.g. in the counter-clockwise direction from the FIG. 1 condition to the FIG. 2 condition, the length of the belt 22 in the lower course 24 will increase, while the length of the belt 22 in the upper course 23 thereof will decrease. When the belt 22 is held stationary by pulley 30 and, lever 40 is rotated in the counterclockwise direction, movement of roller 44 pulls belt 22 around pulley 15, thereby rotating pulley 15, while pulley 14 is held stationary due to the location of roller 45 on the pulley 15 side of pulley 30. As a result, the slack in the media 13 can be removed, so that the media runs smoothly on the platen arrangement 16.

Adjustment of the sprocket in this manner is of course not effected by changes in the length of the belt itself, but only by changing the proportions of the belt that extend in the upper and lower courses. It is hence necessary, in accordance with the invention, to locate the pivot axis 41 at a location such that decreases in the length of one course of the belt are substantially equal to increases in the length of the other course of the belt, as the lever 40 is pivoted. It is apparent that the selection of the position of the axis 41 is also dependent upon the relative locations of the rollers 44, 45. As an example, in the illustrated embodiment of the invention, the axis 41 is along the line extending between the axes of the shafts 10, 11. The invention is not limited, however, to this specific location of the axis 41. Further, while in the illustrated embodiment of the invention, the axis 41 and the axis of the roller 45 are on arms extending from the lever, the invention is not limited to this configuration.

Lever 40, pivot axis 41 and the rollers are selected and positioned to permit the angular displacement or angular position of sprocket wheel 15 relative to a given angular position to be adjusted by a minimum adjustment distance or displacement. A minimum adjustment distance of about 0.5 inch or at least the spacing between adjacent sprocket wheel teeth has been found to be suitable for adjusting the tension of media 13. As illustrated by the positions of reference line 60 in FIGS. 1 and 2, the adjustment distance equals the spacing between adjacent sprocket wheel teeth, which for sprocket wheel 15 is about 0.5 inch. This minimum adjustment distance allows the media to be properly tensioned practically regardless of initial machine setup.

The pivotal mounting of the lever 40 about the axis may include a thumbscrew 52, as seen in FIG. 3, in order to enable the operator to release the lever during an adjustment process, and then fixedly hold the lever at the desired angular displacement after it has been properly adjusted. The thumbscrew is positioned to tighten the lever firmly against the machine frame.

In normal operation, the pulley 30 (driving element) is driven by the motor 50 as described above. Rotation of the pulley 30 drives the belt 22, whereby the belt effects the rotation of the pulleys 20, 21 and other rollers, so that the sprocket wheels 14, 15 are rotated to drive the media in the desired direction and at the desired speed. Since the forces for driving the media pass via the belt 22, it is desirable that the belt 22 engage the drive pulley 30 for at least 180 degrees.

When a new media is to be assembled on the device, the motor 50 is stopped. The stopping of the motor fixes the angular displacement of the pulley 21, and hence the sprocket wheel 14. If, after the media is assembled on the device with the sprocket holes thereof receiving the sprockets of the sprocket wheels 14, 15, it is found that the media is too loose or too tight, the thumbscrew 52 may be released to permit pivoting of the lever 40. The pivoting of the lever effects its angular displacement, and hence the angular displacement of the sprocket wheel 15. When the sprocket wheel 15 has been rotated to a position at which the sprockets thereof are properly received by the holes of the media, and the media has the desired tension, the thumb wheel is tightened to hold the lever 40 at the adjusted position. The device may now be operated to drive the media in the desired manner.

The belt 22 is preferably a timing belt, e.g. a toothed belt that does not permit any slip. It may be comprised, for example, of Kevlar, polyester or fiberglass tension material bound by polyurethane, neoprene or other suitable material.

While the invention has been disclosed and described with reference to a single embodiment, it will be apparent that variations and modification may be made therein, and it is therefore intended in the following claims to cover each such variation and modification as falls within the true spirit and scope of the invention.

What is claimed is:

1. An arrangement for adjusting the angular position of a sprocket wheel that is rotatably mounted on a first axis, comprising a pulley, means for mounting said pulley for rotation with said sprocket wheel, a belt, a holding means for selectively holding said held stationary at a location spaced from said axis, said belt being positioned to extend around said pulley from said spaced location in first and second courses of said belt between said pulley and said spaced location, and adjusting means for simultaneously changing the lengths of said belt in equal and opposite amounts in said first and second courses when said belt is held stationary at said spaced location.

2. The arrangement of claim 1 wherein said holding means comprises a second pulley mounted on a second axis at said spaced location, and means for holding said second pulley from rotation about said second axis.

3. The arrangement of claim 1 wherein said adjusting means comprises first and second rollers mounted on respective axes and positioned to engage said first and second courses, respectively, of said belt, and means for moving the positions of said rollers with respect to said belt.

4. In a sheet medium driving device having first and second sprocket wheels mounted on parallel spaced apart shafts for engaging and driving the sheet medium, the improvement comprising a drive roller, first and second pulleys rotatable with said first and second sprocket wheels, a drive belt extending in driving engagement with said drive roller and said first and second pulleys in a first course of said belt extending from said drive roller to said first pulley and in a second course of said belt extending from said drive roller around said second pulley to said first pulley, and belt adjustment means for simultaneously changing the length of said first course of said belt and said second course of said belt, in equal and opposite amounts, while said drive roller is held stationary, whereby said second sprocket wheel is angularly displaced with respect to said first sprocket wheel.

5. The driving device of claim 4 wherein said belt adjustment means comprises a first roller engaging said first course of said belt between said drive roller and said first pulley, a second roller engaging said second course of said belt between said first and second pulleys, and means for moving the positions of said first and second rollers relative to said first pulley.

6. The driving device of claim 5 wherein said adjustment means comprises an idler roller in engagement with said belt in said first course thereof and a pair of idler rollers in engagement with said belt in said second course thereof, said first roller engaging said belt between said drive roller and said idler roller and said second roller engaging said belt between said pair of idler rollers.

7. The driving device of claim 5 wherein said belt adjustment means further comprises a lever, said first and second rollers being mounted on said lever, and means for pivotally mounting said lever to pivot about an axis parallel to the axis of said first shaft.

8. The driving device of claim 7 wherein said means for mounting said lever comprises a frame to which at least one of said first and second shafts are mounted, and said lever is pivoted to said frame at a location at which pivoting of said lever effects increases in the length of one of said courses of said belt equal to decreases of the other course of said belt.

9. An arrangement for adjusting the angular displacement of a first sprocket wheel rotatably mounted on a first axis relative to the angular position of a second sprocket wheel mounted on a second axis parallel to and spaced from the first axis, comprising first and second pulleys respectively rotatable with said first and second sprocket wheels, a drive belt, holding means for selectively holding said drive belt stationary at a location between said first and second axes, said drive belt extending from said location in driving engagement with said first and second pulleys in a first course from said location to said first pulley and in a second course from said location around said second pulley to said first pulley, and belt adjustment means for simultaneously changing the length of said first course of said belt and said second course of said belt, in equal and opposite amounts while said holding means holds said belt stationary at said location, whereby said second sprocket wheel is angularly displaced with respect to said first sprocket wheel.

10. The arrangement of claim 9 wherein said belt adjustment means comprises a first roller engaging said first course of said belt between said holding means and said first pulley, a second roller engaging said second course of said belt between said first and second pulleys, and means for moving the positions of said first and second rollers relative to said first pulley.

11. The arrangement of claim 10 wherein said adjustment means comprises an idler roller in engagement with said belt in said first course thereof at said location and a pair of idler rollers in engagement with said belt in said second course thereof, said first roller engaging said belt between said drive roller and said idler roller and said second roller engaging said belt between said pair of idler rollers.

12. The arrangement of claim 10 wherein said belt adjustment means further comprises a lever, said first and second rollers being mounted on said lever, and means for pivotally mounting said lever to pivot about an axis parallel to the axis of said first sprocket wheel.

13. The arrangement of claim 12 wherein said means for mounting said lever comprises a frame to which at least one of said first and second sprocket wheels are rotatably mounted, and said lever is pivoted to said frame at a location at which pivoting of said lever effects increases in the length of one of said courses of said belt substantially equal to decreases of the other course of said belt.

14. An arrangement for adjusting the angular position of a sprocket wheel rotatably mounted on a first axis relative to a driving element rotatable about a second axis spaced from the first axis, comprising a first pulley, means for mounting said first pulley for rotation with the sprocket wheel, a belt extending in engagement with said first pulley and the driving element in first and second courses between the driving element and said first pulley and adjustment means acting upon both courses of said belt for simultaneously changing the lengths of said belt by equal and opposite amounts in said first and second courses, thereby rotating said first pulley and the sprocket wheel about the first axis relative to the driving element to adjust the angular position of the sprocket wheel relative to the driving element.

15. The arrangement of claim 14 wherein said adjustment means comprises first and second rollers mounted on respective axes and positioned each to engage a same side of said belt in a different course of said belt, and means for simultaneously moving the positions of said rollers with respect to said belt.

16. The arrangement of claim 14 wherein said adjustment means comprises an idler roller in engagement with said belt in said first course thereof and a pair of idler rollers in engagement with said belt in said second course thereof, said first roller engaging said belt between the driving element and said idler roller and said second roller engaging said belt between said pair of idler rollers.

17. A sheet medium driving device having first and second sprocket wheels mounted on parallel spaced apart shafts for engaging and driving the sheet medium, first and second pulleys respectively mounted on said first and second shafts to rotate with said first and second sprocket wheels, a belt engaging said first and second pulleys, and means for driving said belt including a driving element rotatable about an axis parallel to and spaced from said first shaft, said driving element engaging and driving said belt, said belt extending in driving engagement with said driving element between said driving element and said belt and in engagement with said first and second pulleys in a first course of said belt from said driving element to said first pulley and in a second course of said belt from said driving element around said second pulley to said first pulley, and adjustment means for simultaneously changing the length of said first course of said belt and the length of said second course of said belt, in equal but opposite amounts, to rotate said first sprocket wheel relative to said second sprocket wheel, thereby adjusting the angular position of said first sprocket wheel relative to said second sprocket wheel.

18. The driving device of claim 17 wherein said adjustment means comprises a first roller engaging said belt on a side thereof in said first course of said belt between said driving element and said first pulley, a second roller engaging said belt on said side thereof in said second course of said belt between said first and second pulleys, and means for simultaneously moving the positions of said first and second rollers relative to said first pulley.

19. The driving device of claim 17 wherein said adjustment means comprises an idler roller in engagement with said belt in said first course thereof and a pair of idler rollers in engagement with said belt in said second course thereof, said first roller engaging said belt between said driving element and said idler roller and said second roller engaging said belt between said pair of idler rollers.

20. The driving device of claim 17 wherein said adjustment means further comprises a lever, said first and second rollers being mounted on said lever, and means for pivotally mounting said lever to pivot about an axis parallel to the axis of said first shaft.

21. The driving device of claim 20 wherein said means for mounting said lever comprises a frame to which at least one of said first and second shafts are mounted, and said lever is pivoted to said frame at a location at which pivoting of said lever effects increases in the length of said belt in one of said courses of said belt equal to decreases of the length of said belt in the other course of said belt.

* * * * *